(12) United States Patent
Pan et al.

(10) Patent No.: US 11,544,897 B2
(45) Date of Patent: Jan. 3, 2023

(54) METHOD AND APPARATUS FOR DETERMINING AMBIENT ILLUMINATION IN AR SCENE

(71) Applicant: SAMSUNG ELECTRONICS CO., LTD., Suwon-si (KR)

(72) Inventors: Rui Pan, Nanjing (CN); Dongning Hao, Nanjing (CN); Jie Chen, Nanjing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 182 days.

(21) Appl. No.: 17/192,041

(22) Filed: Mar. 4, 2021

(65) Prior Publication Data

US 2021/0398344 A1 Dec. 23, 2021

(30) Foreign Application Priority Data

Jun. 18, 2020 (CN) .......................... 202010557585.2
Oct. 30, 2020 (KR) ........................ 10-2020-0143450

(51) Int. Cl.
*G06T 15/50* (2011.01)
*G09G 5/10* (2006.01)
(Continued)

(52) U.S. Cl.
CPC ............ *G06T 15/50* (2013.01); *G06T 19/006* (2013.01); *G06T 19/20* (2013.01); *G09G 3/20* (2013.01);
(Continued)

(58) Field of Classification Search
CPC ....... G06T 15/50; G06T 19/006; G06T 19/20; G09G 3/20; G09G 5/10; G09G 2340/16; G09G 2360/141; G09G 2360/144
(Continued)

(56) References Cited

U.S. PATENT DOCUMENTS

2016/0026253 A1\* 1/2016 Bradski ................ H04N 13/128
  345/8
2019/0045162 A1\* 2/2019 Krestyannikov ...... H04N 9/735
2019/0172238 A1 6/2019 Miao et al.

FOREIGN PATENT DOCUMENTS

KR 1020190036868 A 4/2019

\* cited by examiner

*Primary Examiner* — Mark Edwards
(74) *Attorney, Agent, or Firm* — Sughrue Mion, PLLC

(57) ABSTRACT

An apparatus for determining ambient illumination in an AR scene includes: setting virtual light source points in an AR scene, predicting reference illumination parameters of all of the virtual light source points for a current image frame according to a neural network, configuring a reference space confidence and a reference time confidence for the virtual light source points, acquiring a reference comprehensive confidence by fusing the reference space confidence and the reference time confidence, acquiring a fused current comprehensive confidence by comparing the reference comprehensive confidence with a comprehensive confidence of a previous image frame, acquiring illumination parameters of the current frame by correcting the illumination parameters of the current image frame according to the current comprehensive confidence, the previous frame comprehensive confidence and the previous frame illumination parameters, and performing illumination rendering of a virtual object in the AR scene according to the illumination parameters of current frame.

20 Claims, 12 Drawing Sheets

(51) Int. Cl.
  *G09G 3/20* (2006.01)
  *G06T 19/20* (2011.01)
  *G06T 19/00* (2011.01)
(52) U.S. Cl.
  CPC ........... *G09G 5/10* (2013.01); *G09G 2340/16* (2013.01); *G09G 2360/141* (2013.01); *G09G 2360/144* (2013.01)
(58) Field of Classification Search
  USPC ........................................................ 382/162
  See application file for complete search history.

METHOD AND APPARATUS FOR DETERMINING AMBIENT ILLUMINATION IN AR SCENE

CROSS-REFERENCE TO RELATED APPLICATION(S)

This application claims priority under 35 U.S.C. § 119 to Chinese Patent Application No. 202010557585.2 filed on Jun. 18, 2020 in the China National Intellectual Property Administration and Korean Patent Application No. 10-2020-0143450 filed on Oct. 30, 2020 in the Korean Intellectual Property Office. The above-identified patent applications are incorporated by reference herein in their entireties.

BACKGROUND

1. Field

The disclosure relates to Augmented Reality (AR), and, in particular, to a method and an apparatus for determining ambient illumination in an AR scene.

2. Description of Related Art

Augmented Reality (AR) is a technique which in real time computes the position and the pointing direction of a camera capturing images and superimposing corresponding images. It is a new technique which can "seamlessly" integrate real world information and virtual world information, aiming at putting the virtual world into the real world on the screen and enabling interactions.

In the related art, when a virtual object is placed in a real world scene, only a default light source having a default direction and a default intensity is applied to the virtual object, which results in the direction of the shadow of the virtual object is often inconsistent with that of a real world object and the brightness of the virtual object is also inconsistent with the ambient illumination, therefore, the virtual object appears very unreal.

In order to make a virtual object placed in a real world scene to fuse with the real world scene, to avoid the virtual object seems out of place and to make the virtual object appear like a real world object, the relationship between the illumination of the virtual object and the illumination in the real world scene needs to be considered, and efforts should be made to make the pointing direction, the intensity and the color of the virtual light source of the virtual object consistent with those of the real world light source in the real world scene. Here, illumination estimation should be used. Illumination estimation is a technique which estimates the pointing direction, the intensity, the color and other parameters of the light source in the current environment by real-time analyzing preview images of a camera with artificial intelligence (AI).

Apple Inc.'s ARKit and Google Inc.'s ARCore are the most commonly used AR development software, and both have their own illumination estimation modules for illumination estimation. The ARKit can predict the intensity and the color temperature of an ambient light source, while the ARCore can predict the pointing direction of the primary light source in the surrounding environment. However, the ambient illumination of the real world scenes is often very complex, for example, when there are multiple light sources in an indoor environment, these multiple light sources should be taken into consideration for the illumination of a virtual object. Neither ARKit nor ARCore can solve the problem brought by multiple light sources, or can generate a stable and accurate result based on the ambient illumination.

SUMMARY

Embodiments provide a method and an apparatus for determining ambient illumination in an AR scene, so as to acquire a stable and accurate ambient illumination prediction (or estimation) result in a multi-light source environment, and solve the problem of inaccurate ambient illumination prediction (or estimation) for an AR scene in the multi-light source environment, and to better render a virtual object and make virtual objects look more real.

Additional aspects will be set forth in part in the description which follows and, in part, will be apparent from the description, or may be learned by practice of the presented embodiments.

According to an aspect of the disclosure, a method for determining ambient illumination in an AR scene may include: acquiring a reference illumination parameter table of a current image frame captured for an AR scene, and establishing a reference comprehensive confidence table of the current image frame according to shooting information of the current image frame, wherein the reference illumination parameter table and the reference comprehensive confidence table respectively include reference illumination parameters and reference comprehensive confidences of a plurality of virtual light source points; acquiring a current comprehensive confidence table of the current image frame according to the reference comprehensive confidence table and a previous-frame comprehensive confidence table of a previous image frame; and acquiring a current illumination parameter table of the current image frame according to the reference illumination parameter table, the current comprehensive confidence table, the previous-frame comprehensive confidence table and a previous-frame illumination parameter table of the previous image frame, wherein the current illumination parameter table includes currently determined illumination parameters of the plurality of the virtual light source points (on the spherical surface whose center is the shooting position where the current image frame is captured).

Further, the reference illumination parameter table of the current image frame may be acquired by processing the current image frame through prediction of a neural network.

Further, the plurality of virtual light source points may be on a spherical surface whose center is at a shooting position where the current image frame is captured.

Further, the procedure of establishing a reference comprehensive confidence table of the current image frame according to the shooting information of the current image frame may include: establishing a reference space confidence table of the current image frame according to a shooting pointing direction of the current image frame, and establishing a reference time confidence table of the current image frame according to a shooting time of the current image frame, wherein the reference space confidence table and the reference time confidence table respectively include reference space confidences and reference time confidences of the plurality of the virtual light source points on the spherical surface whose center is the shooting position where the current image frame is captured; and acquiring reference comprehensive confidences of all of the virtual light source points according to the following formula, and establishing the reference comprehensive confidence table.

Further, the procedure of acquiring the current comprehensive confidence table of the current image frame according to the reference comprehensive confidence table and the previous-frame comprehensive confidence table of the previous image frame includes: comparing comprehensive confidences of each virtual light source point in the reference comprehensive confidence table and in the previous frame comprehensive confidence table, and acquiring the current comprehensive confidence table after performing judgment and replacement for each of the virtual light source points as follows: if a reference comprehensive confidence in the reference comprehensive confidence table is smaller than a previous-frame comprehensive confidence in the previous frame comprehensive confidence table, replacing a value of the reference comprehensive confidence with a value of the previous-frame comprehensive confidence; and if the reference comprehensive confidence is not smaller than the previous frame comprehensive confidence, retaining (or maintaining) the value of the reference comprehensive confidence.

Further, the method for determining ambient illumination in an AR scene may also include: acquiring a current space confidence table and a current time confidence table of the current image frame according to the reference space confidence table, the reference time confidence table, the reference comprehensive confidence table and the previous-frame comprehensive confidence table of the previous image frame.

Further, the procedure of acquiring the current space confidence table and the current time confidence table of the current image frame according to the reference comprehensive confidence table and the previous frame comprehensive confidence table of the previous image frame may include: comparing comprehensive confidences of each of the virtual light source points in the reference comprehensive confidence table and in the previous-frame comprehensive confidence table, and acquiring the current space confidence table and the current time confidence table after performing judgment and replacement for each of the virtual light source points as follows: if a reference comprehensive confidence in the reference comprehensive confidence table is smaller than a previous-frame comprehensive confidence in the previous-frame comprehensive confidence table, replacing a value of the reference space confidence with a value of the previous-frame space confidence, and replacing a value of the reference time confidence with a value of the previous-frame time confidence; and if the reference comprehensive confidence is not smaller than the previous-frame comprehensive confidence, retaining (or maintaining) the value of the reference space confidence and the value of the reference time confidence; wherein the previous-frame space confidences of all of the virtual light source points are included in a previous-frame space confidence table; and the previous-frame time confidences of all of the virtual light source points are included in a previous-frame time confidence table.

Furthermore, values of the previous-frame time confidences in the previous-frame time confidence table are all smaller than values of the reference time confidences in the reference time confidence table.

Further, the procedure of acquiring the current illumination parameter table of the current image frame according to the reference illumination parameter table, the current comprehensive confidence table, the previous-frame comprehensive confidence-table and the previous-frame illumination parameter table of the previous image frame may include: comparing a current comprehensive confidence of each virtual light source point in the current comprehensive confidence table with a previous-frame comprehensive confidence of each virtual light source point in the previous-frame comprehensive confidence table, and acquiring the current illumination parameter table after acquiring a currently determined illumination parameter of each virtual light source point through judgment and calculation as follows: if a current comprehensive confidence of a virtual light source point is smaller than a previous-frame comprehensive confidence of the virtual light source point, taking the previous-frame illumination parameter of the virtual light source point as the currently determined illumination parameter of the virtual light source point; and if the current comprehensive confidence of a virtual light source point is not smaller than the comprehensive confidence of the previous frame, calculating the currently determined illumination parameter of the virtual light source point according to a defined rule.

Further, the procedure of calculating the currently determined illumination parameter of the virtual light source point according to the defined rule may include calculating the currently determined illumination parameter of the virtual light source point using the current comprehensive confidence, a smoothing coefficient, the reference illumination parameter, the previous frame comprehensive confidence, the previous frame illumination parameter.

Further, the time confidence in the time confidence table of each image frame decreases with time, wherein the time confidence table of each image frame includes the previous-frame time confidence table and the current time confidence table; the time confidence in the reference time confidence table of each image frame is the maximum value of all of the time confidences.

Further, the plurality of the virtual light source points are uniformly distributed on the spherical surface.

According to an aspect of the disclosure, an apparatus for determining ambient illumination in an AR scene may include: a neural network prediction module, for acquiring a reference illumination parameter table of a current image frame by predicting the current image frame of a captured AR scene using a neural network; a comprehensive confidence acquisition module for establishing a reference comprehensive confidence table of the current image frame according to shooting information of the current image frame, and acquiring a current comprehensive confidence table of the current image frame according to the reference comprehensive confidence table and a previous-frame comprehensive confidence table of a previous image frame, wherein the reference illumination parameter table and the reference comprehensive confidence table respectively include reference illumination parameters and reference comprehensive confidences of a plurality of virtual light source points on a spherical surface whose center is at a shooting position where the current image frame is captured; and an illumination parameter acquisition module, for acquiring a current illumination parameter table of the current image frame according to the reference illumination parameter table, the current comprehensive confidence table, the previous-frame comprehensive confidence table and a previous-frame illumination parameter table of the previous image frame, wherein the current illumination parameter table includes currently determined illumination parameters of the virtual light source points on the spherical surface whose center is at the shooting position where the current image frame is captured.

A non-volatile computer-readable storage medium stores instructions that, when executed by a processor, cause the processor to execute steps of the method for determining ambient illumination in an AR scene as described in any one of the above.

According to an aspect of the disclosure, an electronic device may include: at least one processor; and a memory in a communication connection with the at least one processor; wherein the memory stores instructions executable by the at least one processor to cause the at least one processor to execute steps in the method for determining ambient illumination in an AR scene as described in any one of the above.

According to the method and the apparatus for determining ambient illumination in an AR scene, a plurality of virtual light source points are deployed in the scene, reference illumination parameters of each virtual light source point of a current image frame are predicted using a neural network, a corresponding reference space confidence and a corresponding reference time confidence are set for each virtual light source point in the current image frame, the reference space confidence and the reference time confidence are fused to acquire a reference comprehensive confidence, and the reference comprehensive confidence is compared with the corresponding comprehensive confidence of a previous image frame to acquire a current comprehensive confidence of the current image frame which is fused with reference to the previous image frame, determined illumination parameters of the current frame are further acquired by correcting the illumination parameters of the current image frame using the current comprehensive confidence, the previous-frame comprehensive confidence and the previous-frame illumination parameters, and illumination rendering is then applied to a virtual object in the AR scene using the determined illumination parameters of the current frame. According to the method and the apparatus, the illumination rendering is applied to a virtual object in the AR scene by taking the illumination changes in space and time and between the previous and next image frames into consideration at the same time, so that the problems of light shadow jittering and flickering caused by unstable prediction of a single image frame of a virtual object in the AR scene can be effectively avoided, a stable and accurate prediction result of the ambient illumination in a multi-light source environment can be acquired, the problem of inaccurate prediction of the ambient illumination in the AR scene in a multi-light source environment can be solved, better illumination rendering effects of virtual objects in the AR scene can be realized, and virtual objects can be presented to look more real.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

In order to make the objects, technical solutions and advantages more apparent, the disclosure is described in more detail hereinafter with reference to embodiments and the accompanying drawings.

Figure 1:
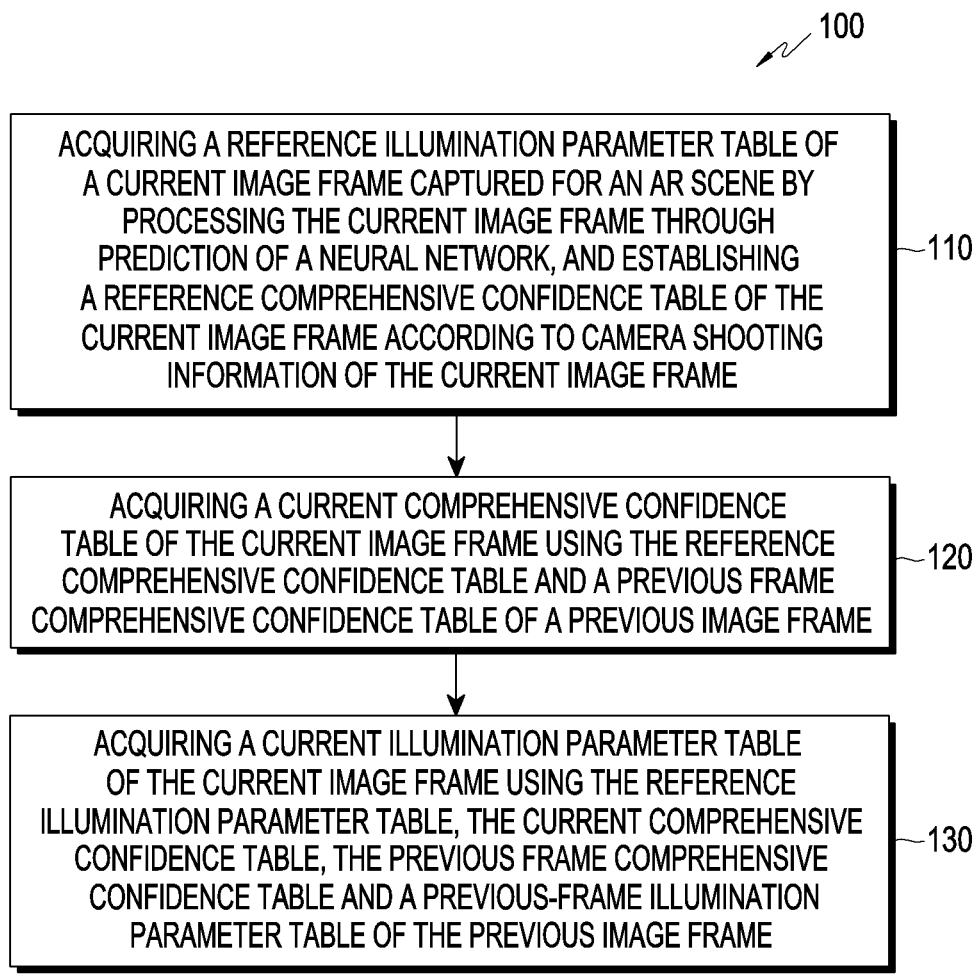
FIG. 1 is a flowchart illustrating a method for determining ambient illumination in an AR scene of an embodiment.

As shown in FIG. 1, the method 100 for determining ambient illumination in an AR scene of an embodiment mainly includes the following procedures.

At step 110, a reference illumination parameter table of a current image frame in an AR scene is acquired by processing the current image frame through prediction of a neural network, and a reference comprehensive confidence table of the current image frame is established according to shooting information of the current image frame, wherein the reference illumination parameter table and the reference comprehensive confidence table respectively record reference illumination parameters and reference comprehensive confidences of a plurality of virtual light source points on a spherical surface whose center is at a shooting position where the current image frame is captured.

At step 120, a current comprehensive confidence table of the current image frame is acquired according to the reference comprehensive confidence table and a previous-frame comprehensive confidence table of a previous image frame.

At step 130, a current illumination parameter table of the current image frame is acquired according to the reference illumination parameter table, the current comprehensive confidence table, the previous-frame comprehensive confidence table and a previous-frame illumination parameter table of the previous image frame. The current illumination parameter table records currently determined illumination parameters of the virtual light source points on the spherical surface whose center is at the shooting position where the current image frame is captured.

The previous image frame is, for example, an image frame that is an image frame undergoing the last time of illumination estimation before the current image frame (the illumination estimation is, e.g., determining ambient illumination according to the method for determining ambient illumination of an embodiment), and in an embodiment, both the current image frame and the previous image frame are video image frames captured in real time. The time interval between the previous image frame and the current image frame may be set according to the performance and requirements of a device performing the method for determining ambient illumination. In an embodiment, a related art processing and communication mechanism may be utilized to ensure that the determination of ambient illumination of the next image frame (i.e. the current image frame captured at the next moment) is performed immediately upon completion of the determination of ambient illumination of the current image frame. In a preferred embodiment, the time interval between the current image frame and the previous image frame is measured by milliseconds or even shorter.

In an embodiment, the plurality of virtual light source points are uniformly distributed on a spherical surface whose center is at the shooting position where the current image frame is captured.

Figure 2:
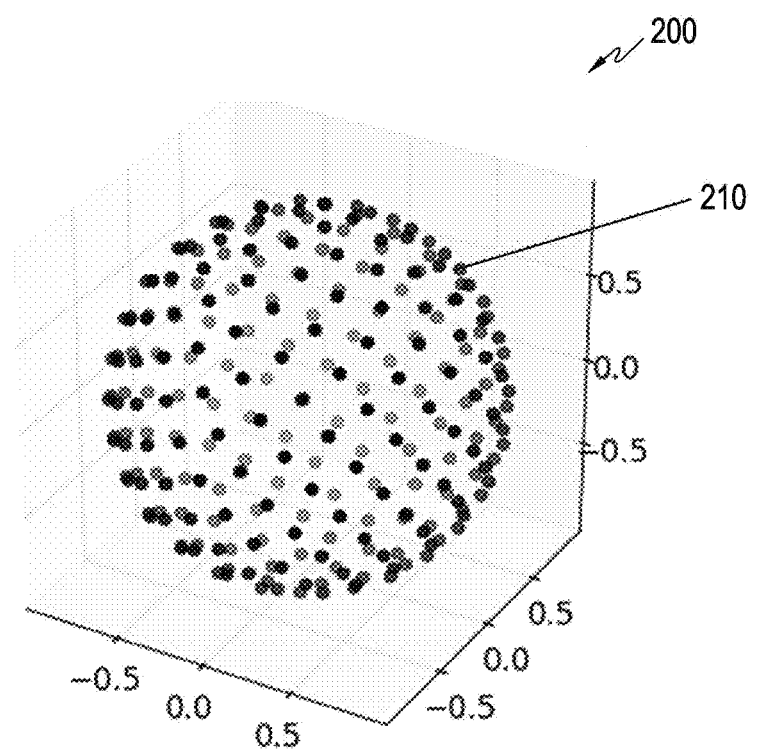
FIG. 2 is a schematic diagram illustrating the distribution of virtual light source points of an embodiment.

FIG. 2 is a schematic diagram 200 illustrating the distribution of virtual light source points according to an embodiment. In an embodiment as shown in FIG. 2, 128 virtual light source points 210 are uniformly arranged on a spherical surface with the shooting position where the current image frame is captured as the center, and each of the virtual light source points 210 represents a light emitting position of a light source of a virtual light in an AR scene. The number of the 128 virtual light source points is merely an example, and not for restricting the number of virtual light source points, and in practice, the number of virtual light source points may be larger or smaller.

In an embodiment, a neural network mode is used to predict the illumination state in a complex indoor multi-light source environment. The neural network model is a neural network model which acquires illumination information about virtual light source points (including RGB parameters of each virtual light source point) through neural network training on ambient illumination of indoor panorama images utilizing a data set of indoor panorama images. The neural network technology is known to those skilled in the art and will not be described in detail herein.

Since there is error in AI prediction results of each image frame, if rendering is performed directly using the prediction result of each image frame, severe uttering or flickering may occur in the illumination effects of virtual objects in the AR scene. In order to avoid those phenomena, in an embodiment, the prediction results of consecutive image frames are fused and corrected based on comprehensive confidences to achieve an effect of smooth changes.

In an embodiment, the procedure of establishing a reference comprehensive confidence table of the current image frame according to the shooting information of the current image frame in step 110 may include:

establishing a reference space confidence table of the current image frame according to a shooting direction of the current image frame, and establishing a reference time confidence table of the current image frame according to a shooting time of the current image frame. The reference space confidence table and the reference time confidence table respectively record reference space confidences and reference time confidences of a plurality of virtual light source points on a spherical surface with the shooting position where the current image frame is captured as the center; and acquiring reference comprehensive confidences of all of the virtual light source points according to the following equation, and establishing the reference comprehensive confidence table:

$$RFCC = A \times RFSC \times RFTC \quad (1)$$

where RFCC is the reference comprehensive confidence, RFSC is the reference space confidence, RFTC is the reference time confidence, A is an adjustment coefficient, and the value of A is preferably 0.1.

The reference space confidence and the reference time confidence of each virtual light source point are preset values, and the method of configuring the reference space confidence and the reference time confidence are as follows.

For each image frame, the illumination parameters of all of the virtual light source points on the spherical surface with the shooting position of the image as the center can be predicted using the neural network. But it can be found in experiments that the neural network prediction results for an area pointed at by the camera capturing images are the most accurate, while the neural network prediction results for an area behind the camera are the least accurate. Therefore, in an embodiment, a space confidence is added to the neural network prediction result according to the pointing direction of the camera. In the space confidences, starting from the direction pointed at by the camera (shooting position) as the central point, and the space confidences gradually decreases outwards along the spherical surface whose center is the shooting position. The space confidence is the largest at the position pointed at by the camera, and is the smallest at the position behind the camera. With regard to the reference space confidences of the current image frame, the value of the reference space confidence of a virtual light source point in the direction pointed at by the camera (shooting position) is the largest, from which the reference space confidence of the virtual light source points gradually decreases along the spherical surface whose center is at the shooting position, with the reference space confidence of the virtual light source point at the position pointed at by the camera being the largest and the reference space confidence of the virtual light source point at the position behind the camera being the smallest. The reference space confidences of the virtual light source points are defined static values. For example, with respect to the current image frame, the reference space confidence of the virtual light source point directly in front of the shooting position is a defined value a, and a is a static value. Since the real world scene directly in front of the shooting position is captured in the current image frame, the corresponding illumination information is the most reliable in the current image frame, and thereby the corresponding reference space confidence is the largest; the reference space confidences of the virtual light source points right above, right below, to the left of and to the right of the shooting position are a set value b, and b is a static value. Although the real world scenes right above, right below, to the left of and to the right of the shooting position do not completely fall into the current image frame or do not fall into the current image frame at all, the illumination information for positions right above, right below, to the left of and to the right of the shooting position can greatly affect the light field distribution right in front of the shooting position, thus have certain contributions to the light field distribution right in front of the shooting position. But since the real world scenes right above, right below, to the left of and to the right of the shooting position do not completely fall into the current image frame or do not fall into the current image frame at all, the corresponding illumination information cannot be directly acquired from the current image frame, and the reference space confidences of virtual light source points right above, right below, to the left of and to the right of the shooting position may be smaller than the reference space confidence of the virtual light source point right in front of the shooting position, i.e., b is smaller than a. The reference space confidence of the virtual light source point right behind the shooting position is a defined value c, and c is a static value. Since the real world scene right behind the shooting position does not fall into the current image frame at all, and the real world scene right behind the shooting position is farthest from the real world scene right in front of the shooting position, in various embodiments, it is tentatively considered that the illumination information right behind the shooting position has minimal (or tentatively no) influence on the light field distribution right in front of the shooting position, so c is smaller than b. In practice, however, the illumination information right behind the shooting position may have a greater influence on the light field distribution right in front of the shooting position, so in various embodiments, a multi-frame fusing mode for predicting ambient illumination is utilized to ensure that the finally acquired illumination parameters of each virtual light source point can reflect the ambient illumination information of the real world scene, and after the reference space confidence of each virtual light source point of the current image frame is acquired, an embodiment may further utilize the space confidence and the time confidence of each virtual light source point of the previous image frame to acquire a final space confidence of each virtual light source point of the current image frame (i.e. the current space confidence). With respect to the current image frame, the reference space confidence is a starting point for calculating the final space confidence, and the current space confidence is the space confidence of the current frame.

In addition, it is assumed that the ambient light source in the space is relatively constant, and the state after a change, such as turning on a light, turning off a light, moving a desk lamp and the like, can be maintained for a long time after such changes occur, but continuous flickering is not included. For such cases, in a short period, the light source can be considered as constant, and the difference in the prediction results between image frames is mainly resulted from calculation error rather than the change of the light source; and in a long period, the light source can be considered as changing. Based on this assumption, various embodiments use a time confidence to discard out dated results. The time confidence of the latest image is the largest, and gradually decreases with time.

In an embodiment, the space confidence, the time confidence, and corresponding combination, i.e., the comprehensive confidence, are utilized to correct the illumination parameters of the current image frame to acquire a relatively stable and lifelike AR illumination effect. The space confidence and the time confidence are defined utilizing the changes between the previous image frame and the next image frame to acquire the stable AR illumination effect, so that the problems of light/shadow jittering and flickering caused by unstable prediction of a single image frame of a virtual object in the AR scene can be avoided.

As used herein, the reference illumination parameter refers to an illumination parameter acquired through neural network prediction only based on the current image frame (i.e., a single frame), and is a final result which has not been corrected by subsequent steps 120 and 130.

As used herein, the reference space confidence refers to a space confidence which is directly established (according to settings) only based on the current image frame (i.e., a single frame); the reference time confidence refers to a time confidence which is directly established (according to settings) only based on the current image frame (i.e., a single frame); the reference comprehensive confidence refers to a comprehensive confidence directly established (according to settings or using the established space confidence and time confidence) only based the current image frame (i.e., a single frame), and the reference comprehensive confidence fuses with the comprehensive confidence of the previous image frame (i.e. the previous-frame comprehensive confidence) to obtain a final comprehensive confidence (i.e. a current comprehensive confidence) of the current frame.

As used herein, the current space confidence refers to a space confidence acquired through comparison and calculation using the reference space confidence, the reference comprehensive confidence and the previous-frame comprehensive confidence; the current time confidence refers to a time confidence acquired through comparison and calculation using the reference time confidence, the reference comprehensive confidence and the previous-frame comprehensive confidence.

As used herein, the reference space confidence is different from the current space confidence, the reference time confidence is different from the current time confidence, and the reference comprehensive confidence is different from the current comprehensive confidence.

In an initial state (such as before capturing the AR scene), global space confidences are 0. When the prediction is started, the current rotation angle of a camera is acquired by AR. For the prediction result of any image frame captured by the camera, a camera-direction-and-location-based temporary space confidence table (including only the region captured by the camera) may be generated using the spatial location and direction of the camera. At that time, after the temporary space confidence table is converted from the camera coordinate system to the world coordinate system, the confidences in the temporary space confidence table and in the global space confidence table (including the entire spherical surface with the shooting position as the center) can be compared, and a position closer to the center of the region captured by the camera may have a larger space confidence. This process is actually the process of converting the coordinates of the reference space confidence from the camera coordinate system to the world coordinate system. The conversion process from the camera coordinate system to the world coordinate system is known to those skilled in the art.

The problem of changes in the light source is taken into account in an embodiment, so effectiveness of the prediction result has certain time restrictions. In an embodiment, the time confidences in the time confidence tables of each image frame may decrease with time. The time confidence tables of each image frame include a previous-frame time confidence table and a current time confidence table. The time confidence of each image frame in the reference time confidence table is the maximum value of all of time confidences. In an embodiment, it is regarded that newer prediction results are more accurate, that is, the later the image shooting time is, the higher the time confidence of the frame is, and the time confidence may gradually decrease with time. When the values of time confidences may be, for example, from 9 to 1, the latest frame has the largest time confidence 9, gradually decreases from 9 to 1 with time if there is no update to each virtual light source point in the illumination information of the virtual light source points, and may be reset to 9 when there is a new prediction result updated for a certain virtual light source point.

In an embodiment, the procedure of acquiring the current comprehensive confidence table of the current image frame according to the reference comprehensive confidence table and the previous-frame comprehensive confidence table of the previous image frame in step 120 may include:

comparing the comprehensive confidences of each virtual light source point in the reference comprehensive confidence table and in the previous-frame comprehensive confidence table, and acquiring the current comprehensive confidence table after performing judgment and replacement for each virtual light source point as follows:

if the reference comprehensive confidence in the reference comprehensive confidence table is smaller than the previous-frame comprehensive confidence in the previous-frame comprehensive confidence table, replacing the value of the reference comprehensive confidence with the value of the previous frame comprehensive confidence; and if the reference comprehensive confidence is not smaller than the previous-frame comprehensive confidence, retaining (or maintaining) the value of the reference comprehensive confidence.

In an embodiment, the method for determining ambient illumination in an AR scene may also include:

acquiring a current space confidence table and a current time confidence table of the current image frame according to the reference space confidence table, the reference time confidence table, the reference comprehensive confidence table and the previous-frame comprehensive confidence table of the previous image frame.

Further, the procedure of acquiring the current space confidence table and the current time confidence table of the current image frame according to the reference comprehensive confidence table and the previous-frame comprehensive confidence table of the previous image frame may include:

comparing the comprehensive confidences of each virtual light source point in the reference comprehensive confidence table and in the previous-frame comprehensive confidence table, and acquiring the current space confidence table and the current time confidence table after performing judgment and replacement for each virtual light source point as follows:

if the reference comprehensive confidence in the reference comprehensive confidence table is smaller than the previous-frame comprehensive confidence in the previous-frame comprehensive confidence table, replacing the value of the reference space confidence with the value of the previous-frame space confidence, and replacing the value of the reference time confidence with the value of the previous-frame time confidence; and if the reference comprehensive confidence is not smaller than the previous frame comprehensive confidence, retaining (or maintaining) values of the reference space confidence and the reference time confidence; in the procedure, the previous-frame space confidences of all of the virtual light source points are recorded in a previous-frame space confidence table; and the previous frame time confidences of all of the virtual light source points are recorded in a previous-frame time confidence table.

It is considered that the newer the prediction result, the more accurate it is, that is, the later the shooting time is, the higher the time confidence of the frame is, and the time confidence gradually decreases with time. Therefore, in an embodiment, the values of the previous-frame time confidences in the previous frame-time confidence table are all smaller than the values of the reference time confidences in the reference time confidence table.

In an embodiment, the procedure of acquiring the current illumination parameter table of the current image frame according to the reference illumination parameter table, the current comprehensive confidence table, the previous-frame comprehensive confidence table and the previous-frame illumination parameter table of the previous image frame in step 130 may include:

comparing the current comprehensive confidence of each virtual light source point in the current comprehensive confidence table and the previous frame comprehensive confidence in the previous frame comprehensive confidence table, and acquiring the current illumination parameter table after acquiring the currently determined illumination parameter of each virtual light source point through judgment and calculation as follows:

if the current comprehensive confidence of the virtual light source point is smaller than the previous-frame comprehensive confidence, taking the previous-frame illumination parameter of the virtual light source point as the currently determined illumination parameter of the virtual light source point; and if the current comprehensive confidence of the virtual light source point is not smaller than the previous-frame comprehensive confidence, calculating the currently determined illumination parameter of the virtual light source point according to a defined rule.

Further, in an embodiment, calculating the currently determined illumination parameter of the virtual light source point according to the defined rule may include calculating the currently determined illumination parameter of the virtual light source point using the following equation:

$$CLP = (CFCC \times SF \times RFLP + PFCC \times PFLP)/(CFCC \times SF + PFCC) \quad (2)$$

where CFCC is the current comprehensive confidence, SF is a smoothing coefficient, RFLP is the reference illumination parameter, PFCC is the previous-frame comprehensive confidence, PFLP is the previous-frame illumination parameter, and CLP is the currently determined illumination parameter.

In an embodiment, a comprehensive confidence is set for each virtual light source point to take both influencing factors of illumination state of the whole real world space of the AR scene and time, which can be calculated as follows:

$$RFCC = A \times RFSC \times RFTC \quad (1)$$

where RFCC is the reference comprehensive confidence, RFSC is the reference space confidence, RFTC is the reference time confidence, and A is an adjustment coefficient.

By adopting an embodiment, when the prediction of a new image frame is completed, the reference comprehensive confidence can be acquired using the defined space confidence (i.e. reference space confidence) of each virtual light source point of the current frame and the time confidence (i.e. reference time confidence) of the current frame (i.e. the new image frame) according to the above equation (1), then the current comprehensive confidence of each virtual light source point of the current image frame is finally acquired by performing the above comparison and the calculation of the equation (2) using the reference comprehensive confidence of each virtual light source point with an existing comprehensive confidence (i.e. the previous-frame comprehensive confidence), and finally, a current illumination parameter of each virtual light source point of the current image frame is acquired by correcting the reference illumination parameter of the current image frame utilizing the current frame comprehensive confidence, the previous-frame comprehensive confidence and the previous-frame illumination parameter. At that moment, the acquired current illumination parameter has simultaneously taken into account the transition of the illumination condition (light field distribution) from the previous image frame to the current image frame in terms of space and time, and are fused through the defined conditions and equations, so that the transition of the illumination parameter of the virtual object in the AR scene from the previous image frame to the next image frame is more smooth, and shaking and flickering can be avoided.

Hereinafter, embodiments will be further explained through a simplified scenario. For facilitating description, the spatial positions of 128 virtual light source points are simplified to planar positions of 8 virtual light source points, and the RGB illumination parameters are simplified to a light intensity parameter ranging from 1 to 8. The space confidence and time confidence are simplified to integers from 1 to 9.

Figure 3A:
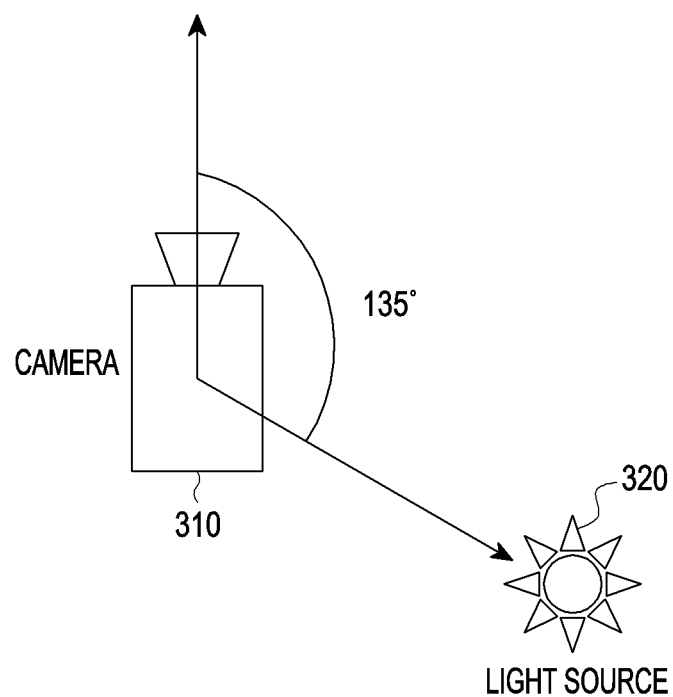
FIG. 3A is a schematic diagram illustrating an initial position of a camera in a simplified scene of an embodiment.
Figure 3B:
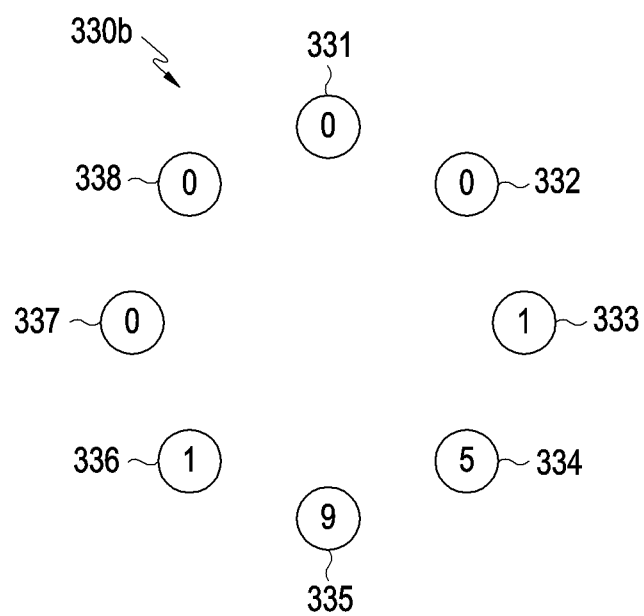
FIG. 3B is a schematic diagram illustrating the distribution of reference illumination parameters of the virtual light source point acquired based on the initial position of the camera as shown in FIG. 3A.
Figure 3C:
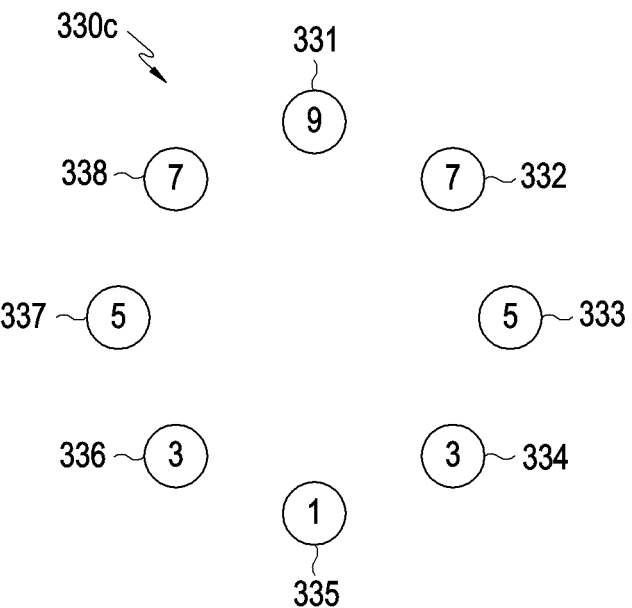
FIG. 3C is a schematic diagram illustrating the distribution of reference space confidences of the virtual light source points based on the initial position of the camera as shown in FIG. 3A.
Figure 3D:
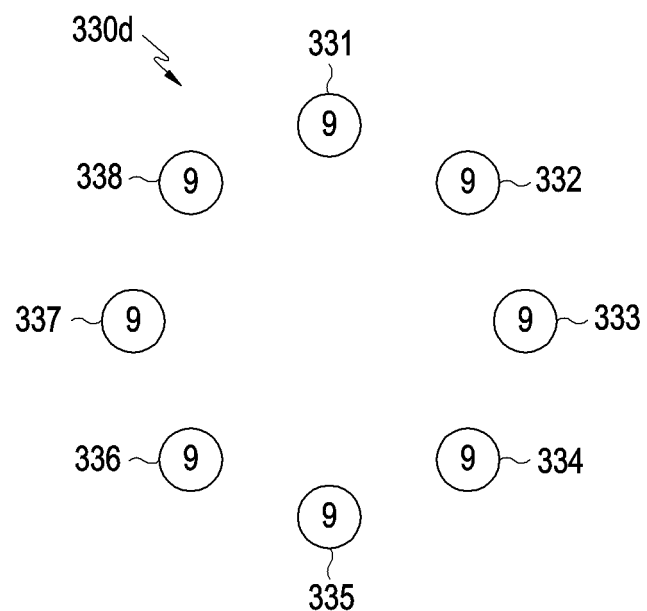
FIG. 3D is a schematic diagram illustrating the distribution of the reference time confidences of a first image frame acquired at the initial position of the camera as shown in FIG. 3A.

There is a real light source 320 in the scene at a position behind the camera 310 which forms a 135 degree oblique angle with the initial position of the camera 310, as shown in FIG. 3A. The first image frame captured from the initial position of the camera 310 shown in FIG. 3A is processed through prediction of the neural network to generate reference illumination parameters of all of the virtual light source points in the first image frame, and the distribution 330b of the reference illumination parameters is as shown in FIG. 3B. The distribution 330c of reference space confidences of all of the virtual light source points 331, 332, 333, 334, 335, 336, 337 and 338 in the first image frame corresponding to the initial position of the camera as shown in FIG. 3A is as shown in FIG. 3C. The reference space confidences of all of the virtual light source points 331, 332, 333, 334, 335, 336, 337 and 338 in the first image frame in FIG. 3C form a reference space confidence table of the first image frame, and the reference space confidence of each virtual light source point in FIG. 3C is a defined value. It can be seen that, since the camera 310 is pointing ahead, the space confidence of the virtual light source point 331 in front of the camera 310 is the largest (i.e., 9), and the space confidence of the virtual light source point 335 behind the camera is the smallest (i.e., 1). The distribution 330d of the reference time confidences of the first image frame acquired at the initial position of the camera as shown in FIG. 3A is as shown in FIG. 3D. The reference time confidences of all of the virtual light source points 331, 332, 333, 334, 335, 336, 337 and 338 as shown in FIG. 3D form a reference time confidence table, where the reference time confidence of each virtual light source point is the largest (9) as shown in FIG. 3D. Referring to FIG. 3B, at the moment, the light source direction is regarded as right behind, i.e., the direction of 180 degrees (which is 9).

Figure 4A:
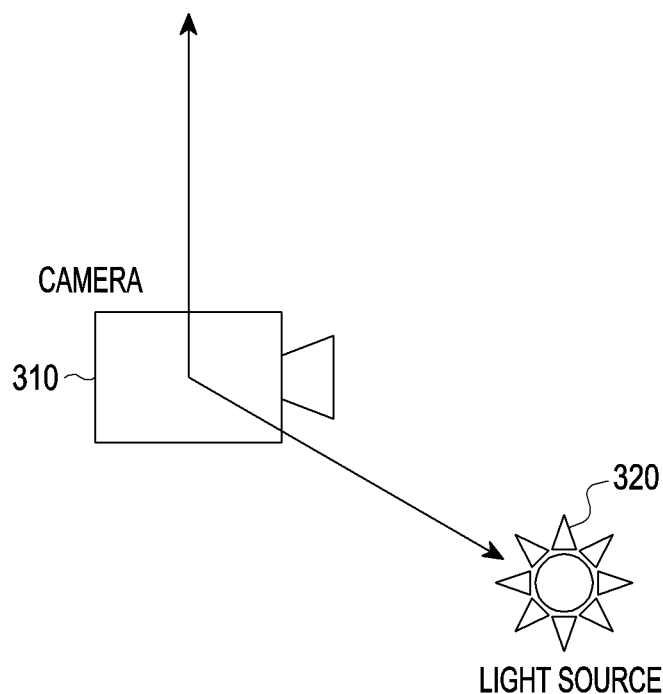
FIG. 4A is a schematic diagram illustrating a second position of the camera in a simplified scene of an embodiment.
Figure 4B:
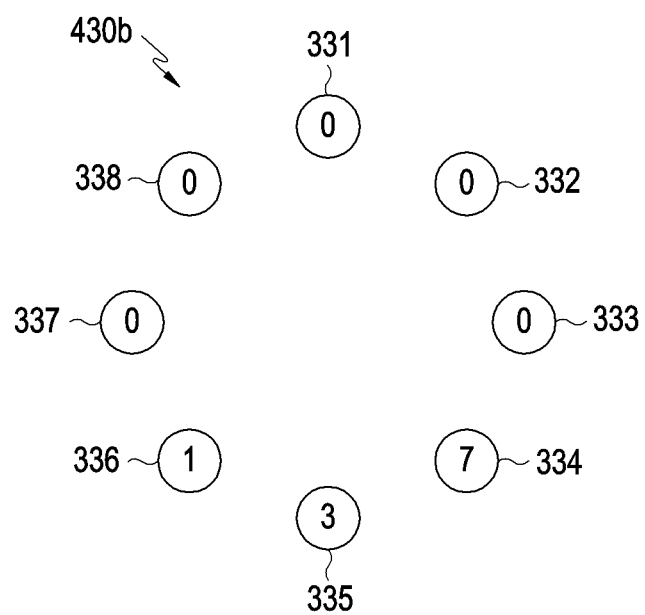
FIG. 4B is a schematic diagram illustrating the distribution of reference illumination parameters of virtual light source points acquired based on the second position of the camera as shown in FIG. 4A.
Figure 4C:
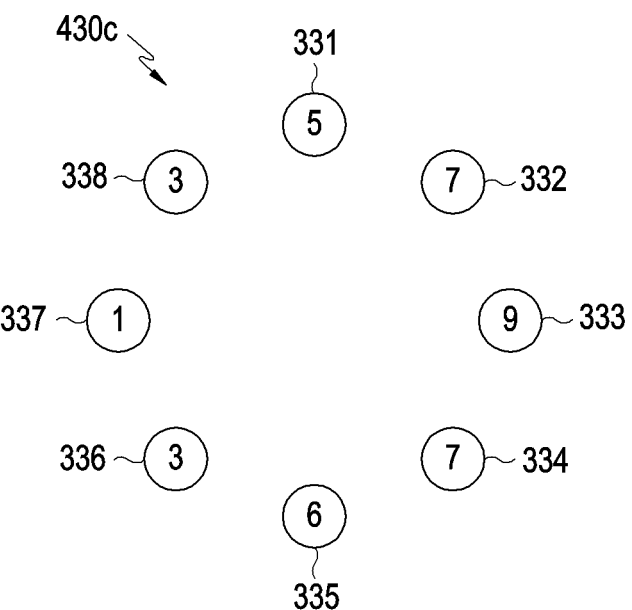
FIG. 4C is a schematic diagram illustrating the distribution of reference space confidences of the virtual light source points based on the second position of the camera as shown in FIG. 4A.
Figure 4D:
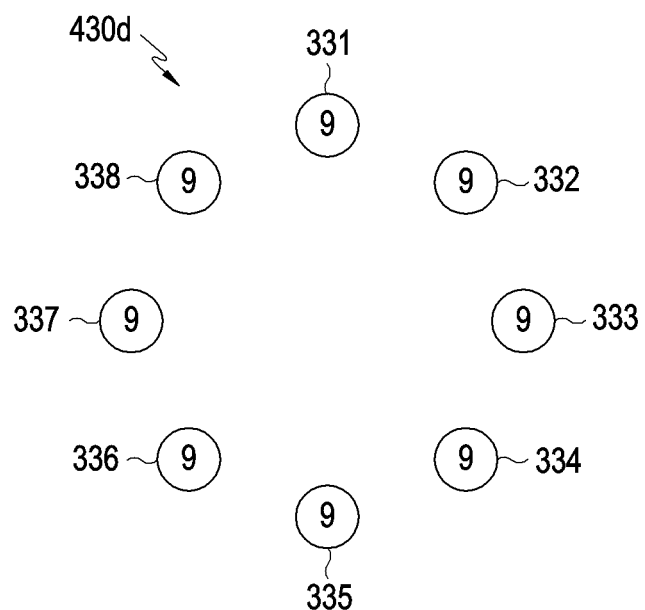
FIG. 4D is a schematic diagram illustrating the distribution of reference time confidences of a second image frame acquired based on the second position of the camera as shown in FIG. 4A.
Figure 4E:
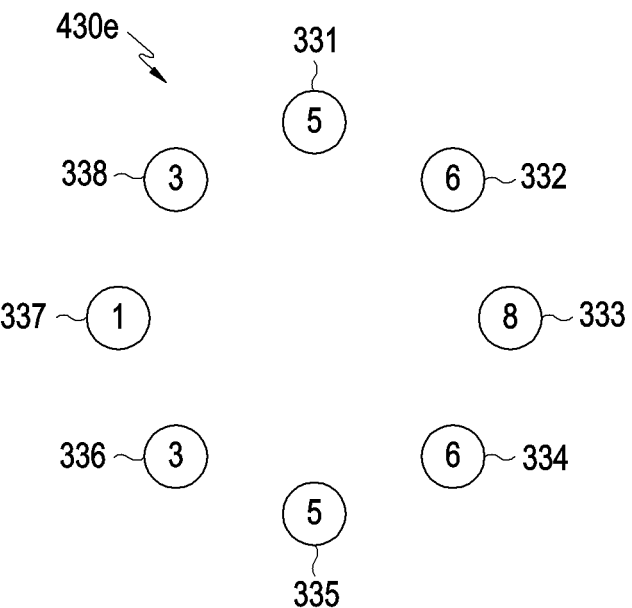
FIG. 4E is a schematic diagram illustrating the distribution of reference comprehensive confidences of the second image frame acquired based on the second position of the camera as shown in FIG. 4A.

After that, the camera as shown in FIG. 3A is rotated by 90 degrees clockwise, the schematic diagram illustrating the second position of the camera as shown in FIG. 4A can be obtained. A second image frame captured at the second position of the camera 310 shown in FIG. 4A is processed through prediction of the neural network to generate the reference illumination parameters of all of the virtual light source points 331, 332, 333, 334, 335, 336, 337 and 338 of the second image frame, and the distribution 430b of the reference illumination parameters is as shown in FIG. 4B. The distribution 430c of the reference space confidences of all of the virtual light source points 331, 332, 333, 334, 335, 336, 337 and 338 of the second image frame corresponding to the second position of the camera 310 as shown in FIG. 4A is as shown in FIG. 4C. The reference space confidences of all of the virtual light source points 331, 332, 333, 334, 335, 336, 337 and 338 of the second image frame in FIG. 4C form a reference space confidence table of the second image frame. The reference space confidence of each virtual light source point in FIG. 4C is a defined value. It can be seen that the camera 310 is pointing rightwards in the diagram after the rotation, so the space confidence of the virtual light source point 433 in front of the camera (i.e. to the right of the camera in FIG. 4C) is the largest (i.e., 9), and the space confidence of the virtual light source point 437 behind the camera 310 (i.e. to the left of the camera in FIG. 4C) is the smallest (i.e., 1). The distribution 430d of the reference time confidences of the second image frame captured at the second position of the camera 310 as shown in FIG. 4A is shown in FIG. 4D, and the reference time confidences of all of the virtual light source points 331, 332, 333, 334, 335, 336, 337 and 338 in FIG. 4D form a reference time confidence table of the second image frame. In FIG. 4D, the reference time confidence of each virtual light source point is the largest (i.e., 9). The reference space confidence of each virtual light source point of the second image frame shown in FIG. 4C and the reference time confidence of each virtual light source point of the second image frame shown in FIG. 4D are processed through the following equation (1) to acquire a distribution diagram 430e as shown in FIG. 4E illustrating reference comprehensive confidences (after rounding) of the virtual light source points of the second image frame.

$$RFCC = A \times RFSC \times RFTC \quad (1)$$

where the value of A is 0.1.

Figure 5A:
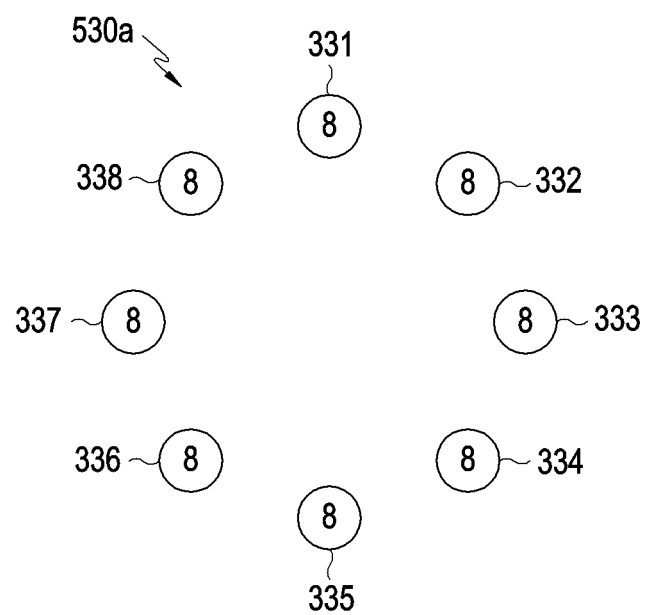
FIG. 5A is a schematic diagram illustrating the distribution of time confidences of the first image frame relative to the second image frame.

If the second image frame is taken as the current image frame, the first image frame is the previous image frame of the second image frame. At that moment, the time confidences of the first image frame decrease to be in the distribution 530a as shown in FIG. 5A, where the time confidence of each virtual light source point decreases to 8, i.e., the time confidence of each virtual light source point of the previous image frame is 8. Meanwhile, for the second image frame, the space confidences of the previous image frame (i.e. the first image frame) are as shown in FIG. 3C.

Figure 5B:
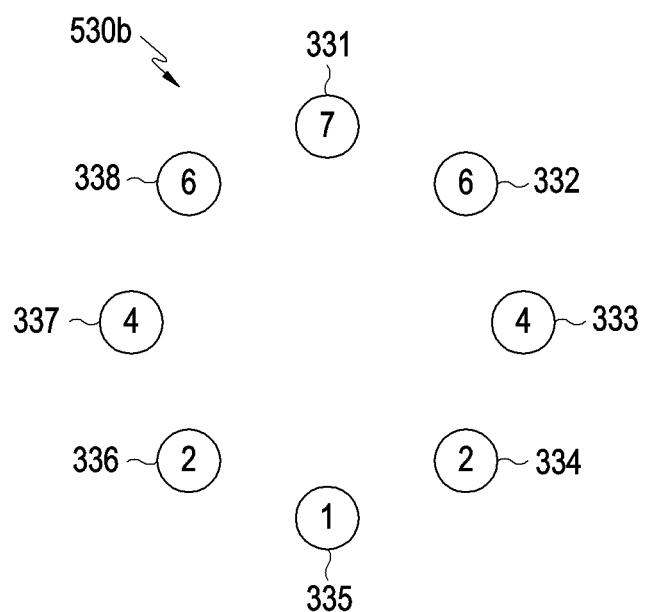
FIG. 5B is a schematic diagram illustrating the distribution of comprehensive confidences of the first image frame relative to the second image frame.

Then the distribution 530b of comprehensive confidences (after rounding) of the previous image frame (i.e. the first image frame) as shown in FIG. 5B can be acquired from FIG. 5A, FIG. 3C and the following equation.

Comprehensive confidence=$A$×space confidence×time confidence where the value of $A$ is 0.1.

The reference comprehensive confidences of the current image frame (i.e., the second image frame) (as shown in FIG. 4E) are compared with the comprehensive confidences of the previous image frame (i.e., the first image frame) (as shown in FIG. 5B), and for any one of the virtual light source points 331, 332, 333, 334, 335, 336, 337 and 338:

if the reference comprehensive confidence of the second image frame is smaller than the comprehensive confidence of the first image frame, the value of the reference comprehensive confidence of the second image frame is replaced with the value of the comprehensive confidence of the first image frame; and if the reference comprehensive confidence of the second image frame is not smaller than the comprehensive confidence of the first image frame, the reference comprehensive confidence of the second image frame is retained.

Figure 6A:
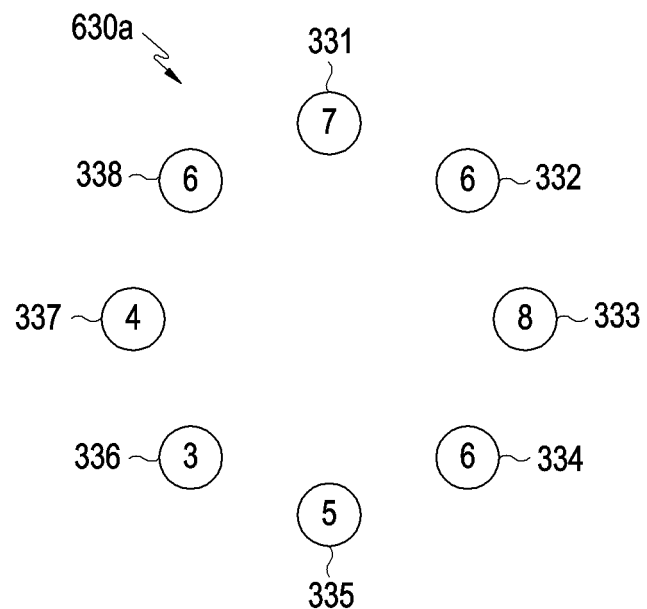
FIG. 6A is a schematic diagram illustrating the distribution of current comprehensive confidences of the second image frame.

From the above comparison, the distribution 630a of the current comprehensive confidences of the second image frame is acquired, as shown in FIG. 6A.

The current space confidences of the second image frame are acquired by the following method.

The reference comprehensive confidences of the current image frame (i.e., the second image frame) (as shown in FIG. 4E) are compared with the comprehensive confidences of the previous image frame (i.e., the first image frame) (as shown in FIG. 5B), and for any one of the virtual light source points 331, 332, 333, 334, 335, 336, 337 and 338:

if the reference comprehensive confidence of the second image frame is smaller than the comprehensive confidence of the first image frame, the value of the reference space level of the second image frame is replaced with the value of the space confidence of the first image frame; and if the reference comprehensive confidence of the second image frame is not smaller than the comprehensive confidence of the first image frame, the value of the reference space confidence of the second image frame is retained.

Figure 6B:
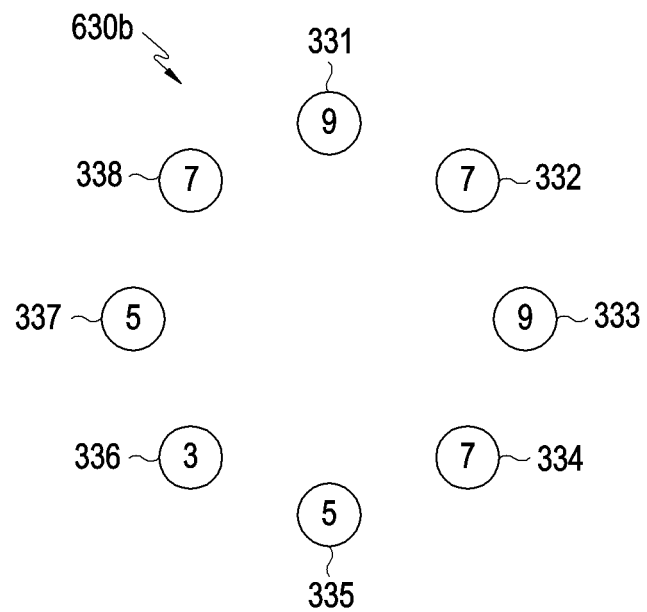
FIG. 6B is a schematic diagram illustrating the distribution of current space confidences of the second image frame.

From the above comparison, the distribution 630b of the current space confidences of the second image frame is acquired, as shown in FIG. 6B.

The current time confidences of the second image frame are acquired by the following method.

The reference comprehensive confidences of the current image frame (i.e., the second image frame) (as shown in FIG. 4E) are compared with the comprehensive confidences of the previous image frame (i.e., the first image frame) (as shown in FIG. 5B), and for any one of the virtual light source points 331, 332, 333, 334, 335, 336, 337 and 338:

if the reference comprehensive confidence of the second image frame is smaller than the comprehensive confidence of the first image frame, the value of the reference time confidence of the second image frame is replaced with the value of the time confidence of the first image frame; and if the reference comprehensive confidence of the second image frame is not smaller than the comprehensive confidence of the first image frame, the value of the reference time confidence of the second image frame is retained.

Figure 6C:
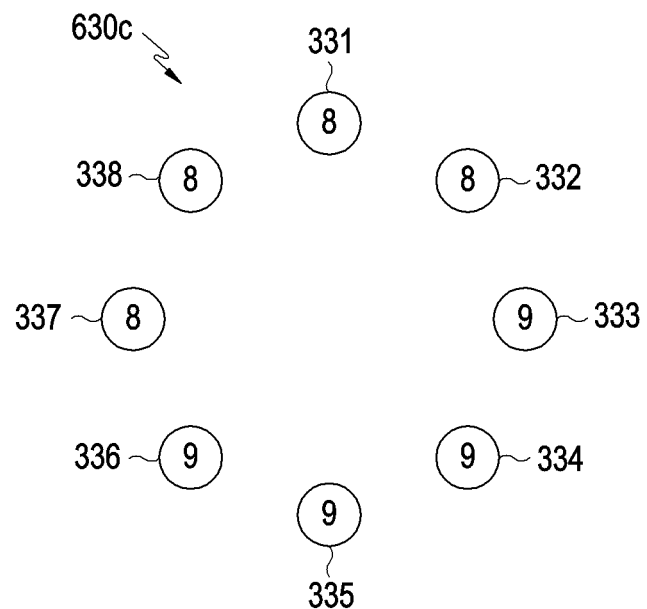
FIG. 6C is a schematic diagram illustrating the distribution of current time confidences of the second image frame.

From the above comparison, the distribution 630c of the current time confidences of the second image frame is acquired, as shown in FIG. 6C.

Figure 7:
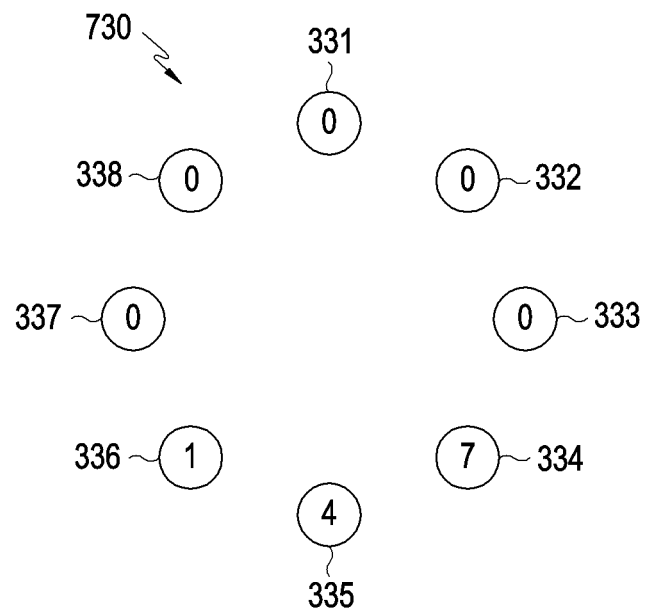
FIG. 7 is a schematic diagram illustrating the distribution of currently determined illumination parameters of the second image frame.

In the simplified scene of an embodiment, no image frame is captured before the first image frame, so the reference illumination parameters of all of the virtual light source points corresponding to the initial position of the camera as shown in FIG. 3B are the illumination parameters of the first image frame, and for the second image frame, the illumination parameters of the first image frame as shown in FIG. 3B are the illumination parameters of the previous frame. Then the illumination parameters of the first image frame as shown in FIG. 3B, the reference illumination parameters of the second image frame as shown in FIG. 4B, the comprehensive confidences of the first image frame as shown in FIG. 5B, the current comprehensive confidences of the second image frame as shown in FIG. 6A are fused and processed using the following equation to generate the distribution 730 of the currently determined illumination parameters (after rounding) of the second image frame as shown in FIG. 7.

$CLP=(CFCC \times SF \times RFLP + PFCC \times PFLP)/(CFCC \times SF + PFCC)$ where CFCC is the current comprehensive confidence (i.e. the current comprehensive confidence of the second image frame as shown in 6A), SF is a smoothing coefficient (e.g. being 1), RFLP is the reference illumination parameter (i.e. the reference illumination parameter of the second image frame as shown in 4B), PFCC is the previous-frame comprehensive confidence (i.e. the comprehensive confidence of the first image frame as shown in 5B), PFLP is the previous-frame illumination parameter (i.e. the illumination parameter of the first image frame as shown in 3B), CLP is the currently determined illumination parameter (i.e. the currently determined illumination parameter of the second image frame as shown in 7).

Hence, the determination of the current illumination parameters of all of the virtual light source points of the second image frame is completed. After the current illumination parameters of all of the virtual light source points of the second image frame are acquired, the current illumination parameters can be utilized to perform illumination rendering of a virtual object in an AR scene and acquire a vivid rendering effect.

The running process of an application implementing the method for determining ambient illumination in an AR scene of embodiments may include the following procedures:

1) a user opens an AR application, searches for a planar surface, and places a virtual object;

2) meanwhile, an illumination parameter table, a space confidence table and a time confidence table under a world coordinate system are constructed according to corresponding procedures in the method for determining ambient illumination in an AR scene of embodiments;

3) illumination parameter estimation is performed for each frame under the camera coordinate system using a preview image captured by the camera according to corresponding procedures in the method for determining ambient illumination in an AR scene of embodiments;

4) coordinates of the camera in a world coordinate system are acquired by a built-in camera pose system in the AR, and illumination parameters in the camera coordinate system are converted into an illumination parameter table in the world coordinate system according to the camera pose;

5) the illumination parameter table is updated based on the space confidences and the time confidences according to corresponding procedures in the method for determining ambient illumination in an AR scene of embodiments, and the space confidence table and the time confidence table are also updated to acquire smooth and changeable illumination parameters; and 6) the virtual object is rendered using the updated illumination parameters.

The rendering of the virtual object using the illumination parameters can be achieved according to the related art techniques known to those skilled in the art and will not be described in detail herein.

Figure 8:
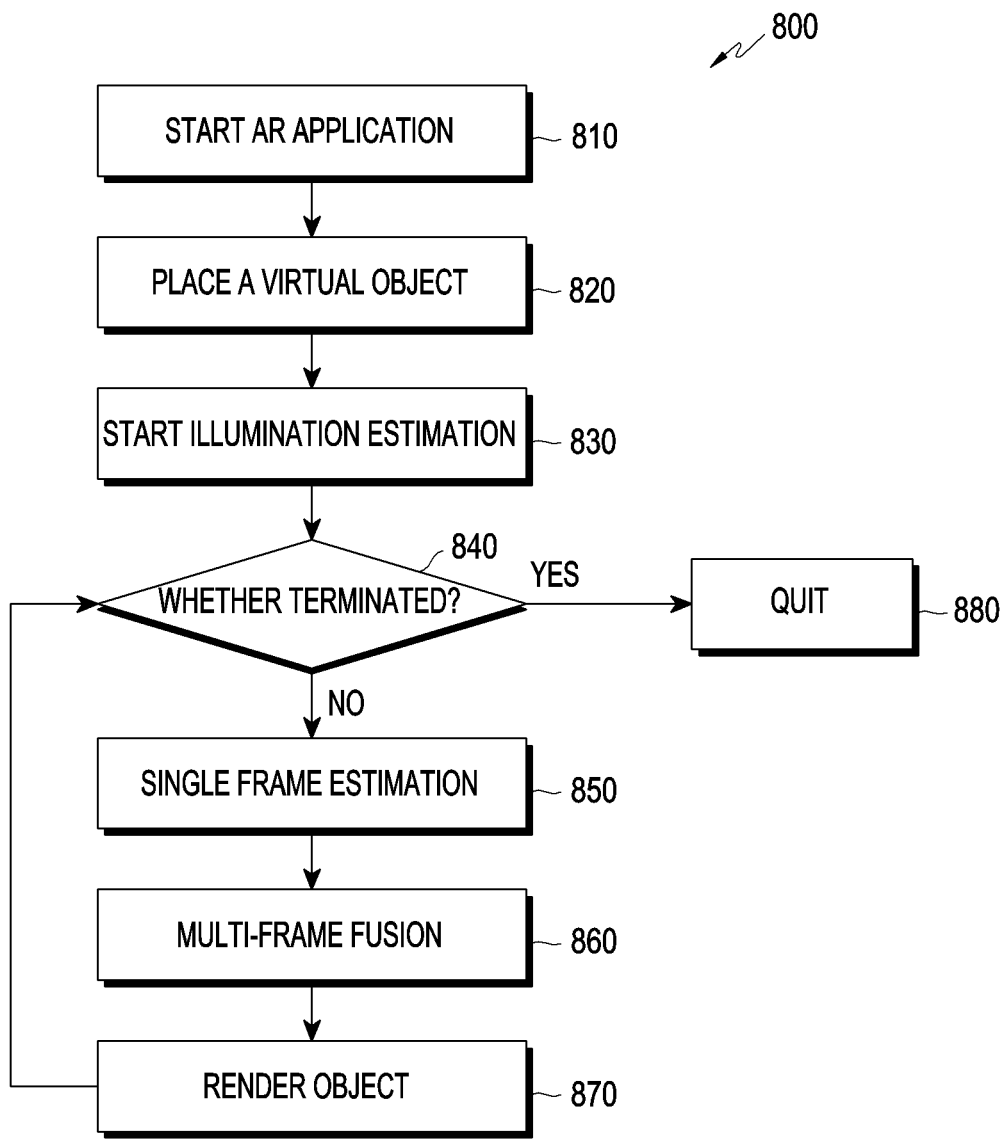
FIG. 8 is a general operational flowchart illustrating a method for determining ambient illumination in an AR scene according to an embodiment.

As shown in FIG. 8, a general operation flow 800 of the method for determining ambient illumination in an AR scene according to an embodiment mainly include the following procedures.

Step 810, an AR application is started, and step 820 is then performed.

Step 820, a virtual object is placed, and step 830 is then performed.

Step 830, illumination estimation is activated, and step 840 is then performed.

The illumination estimation can be implemented according to related art techniques known to those skilled in the art.

Step 840, it is judged whether to terminate the process, i.e., whether the AR application is closed, if it is determined to terminate the process, the process is terminated at step 880; otherwise, step 850 is performed Step 850, a single-frame prediction process is executed, and step 860 is then performed.

The single-frame prediction process can be implemented according to the above relevant description of the method for determining ambient illumination in an AR scene of embodiments, such as the procedures of predicting a current image frame of the captured AR scene using a neural network, acquiring a reference illumination parameter table of the current image frame, and establishing a reference comprehensive confidence table of the current image frame according to the shooting information of the current image frame, or the like.

Step 860, a multi-frame fusing process is executed, and step 870 is then performed.

The multi-frame fusing process can be implemented according to the above relevant description of the method for determining ambient illumination in an AR scene of embodiments, such as the procedures of acquiring a current comprehensive confidence table of the current image frame using the reference comprehensive confidence table and the previous-frame comprehensive confidence table of the previous image frame, acquiring a current illumination parameter table of the current image frame using the reference illumination parameter table, the current comprehensive confidence table, the previous-frame comprehensive confidence table and the previous-frame illumination parameter table of the previous image frame, or the like.

Step 870, the virtual object is rendered using the current illumination parameter table of the current image frame, and the step d is then re-performed.

Figure 9:
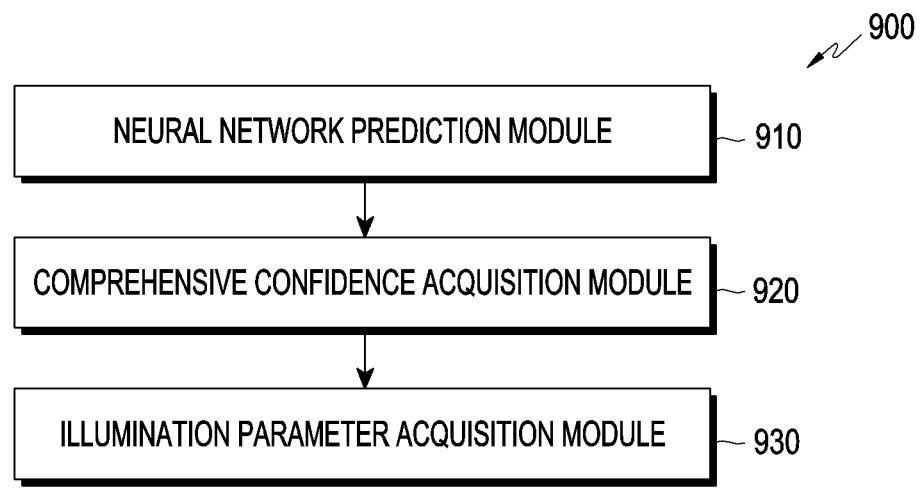
FIG. 9 is a schematic diagram illustrating an apparatus for determining ambient illumination in an AR scene of an embodiment.

Various embodiments also provide an apparatus 900 for determining ambient light in an AR scene, as shown in FIG. 9, which includes a neural network prediction module 910, a comprehensive confidence acquisition module 920 and an illumination parameter acquisition module 930.

The neural network prediction module 910 is for predicting the current image frame of the captured AR scene using a neural network to acquire a reference illumination parameter table of the current image frame.

The comprehensive confidence acquisition module 920 is for establishing a reference comprehensive confidence table of the current image frame using shooting information of the current image frame, and acquiring a current comprehensive confidence table of the current image frame using the reference comprehensive confidence table and a previous-frame comprehensive confidence table of the previous image frame. The reference illumination parameter table and the reference comprehensive confidence table respectively record the reference illumination parameters and the reference comprehensive confidences of a plurality of virtual light source points on a spherical surface whose center is at a shooting position of the current image frame. The illumination parameter acquisition module 300 is for acquiring a current illumination parameter table of the current image frame using the reference illumination parameter table, the current comprehensive confidence table, the previous-frame comprehensive confidence table and a previous-frame illumination parameter table of the previous image frame. The current illumination parameter table records currently determined illumination parameters of a plurality of virtual light source points on the spherical surface whose center is at the shooting position of the current image frame.

Various embodiments also provide a non-transitory computer-readable storage medium storing instructions that, when executed by a processor, can cause the processor to perform procedures of the method for determining ambient illumination in an AR scene as described above.

Figure 10:
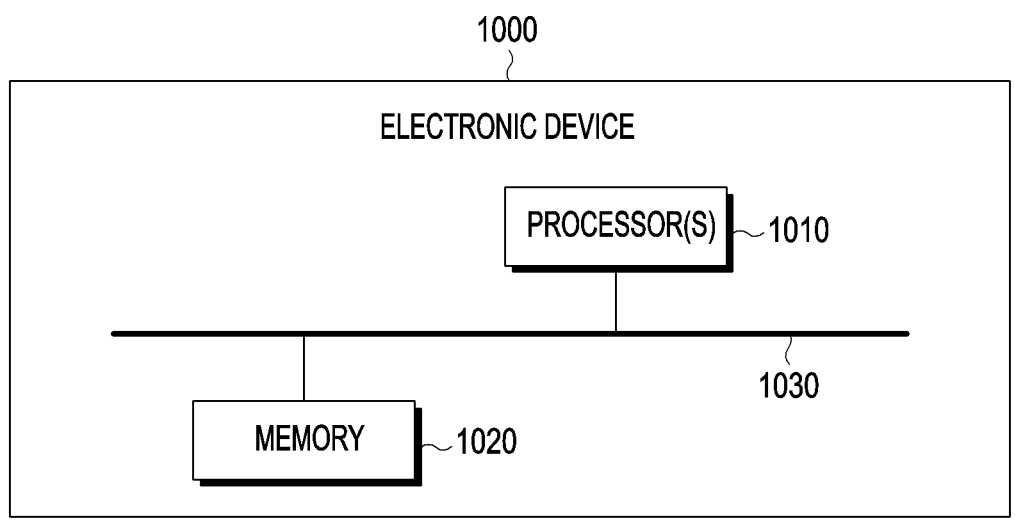
FIG. 10 is a schematic diagram illustrating the structure of an electronic device in an embodiment.

Various embodiments also provide an electronic device capable of executing the method for determining ambient illumination in an AR scene, as shown in FIG. 10. The electronic device 1000 may include: at least one processor 1010 and a memory 1020. The memory 1020 is in a communication connection with the at least one processor 1010, e.g., the memory 1020 and the at least one processor 1010 are connected via a bus 1030. The memory 1020 stores instructions executable by the at least one processor 1010 to cause the at least one processor 1010 to execute the procedures in the method for determining ambient illumination in an AR scene as described above.

The electronic device 1000 may include the camera 310 as shown in FIG. 3A. The camera 310 may be controlled by the at least one processor 1010. The camera 310 may be in a communication connection (or operatively connected) with the at least one processor 1010, e.g., the camera 310 and the at least one processor 1010 are connected via the bus 1030.

The electronic device 1000 may include a display for displaying an AR scene or a virtual object. The display may be controlled by the at least one processor 1010. The display may be in a communication connection (or operatively connected) with the at least one processor 1010, e.g., the display and the at least one processor 1010 are connected via the bus 1030.

While certain embodiments have been particularly shown and described with reference to the drawings, embodiments are provided for the purposes of illustration and it will be understood by one of ordinary skill in the art that various modifications and equivalent other embodiments may be made from the disclosure. Accordingly, the true technical scope of the disclosure is defined by the technical spirit of the appended claims.

What is claimed is:

1. A method for determining ambient illumination in an augmented reality (AR) scene, the method comprising:
acquiring a reference illumination parameter table of a current image frame captured for the AR scene;
establishing a reference comprehensive confidence table of the current image frame according to shooting information of the current image frame, wherein the reference illumination parameter table and the reference comprehensive confidence table respectively include reference illumination parameters and reference comprehensive confidences of a plurality of virtual light source points;

acquiring a current comprehensive confidence table of the current image frame according to the reference comprehensive confidence table and a previous frame comprehensive confidence table of a previous image frame; and acquiring a current illumination parameter table of the current image frame according to the reference illumination parameter table, the current comprehensive confidence table, the previous frame comprehensive confidence table and a previous frame illumination parameter table of the previous image frame, wherein the current illumination parameter table includes currently determined illumination parameters of the plurality of virtual light source points on a spherical surface whose center is at a position where the current image frame is captured.

2. The method of claim 1, wherein the reference illumination parameter table of the current image frame is acquired based on processing the current image frame through prediction of a neural network.

3. The method of claim 1, wherein the plurality of virtual light source points are disposed on the spherical surface whose center is at the position where the current image frame is captured.

4. The method of claim 1, wherein the establishing of the reference comprehensive confidence table of the current image frame according to the shooting information of the current image frame comprises:

establishing a reference space confidence table of the current image frame according to a location and a pointing direction of a camera corresponding to the current image frame, and establishing a reference time confidence table of the current image frame according to time when the current image frame is captured, wherein the reference space confidence table and the reference time confidence table respectively include reference space confidences and reference time confidences of the plurality of virtual light source points on the spherical surface whose center is at the position where the current image frame is captured; and acquiring the reference comprehensive confidence of each of the plurality of virtual light source points, and establishing the reference comprehensive confidence table.

5. The method of claim 1, wherein the acquiring of the current comprehensive confidence table of the current image frame according to the reference comprehensive confidence table and the previous frame comprehensive confidence table of the previous image frame comprises:

comparing comprehensive confidences of each of the plurality of virtual light source points in the reference comprehensive confidence table and in the previous frame comprehensive confidence table;

if a reference comprehensive confidence in the reference comprehensive confidence table is smaller than a previous frame comprehensive confidence in the previous frame comprehensive confidence table, replacing a value of the reference comprehensive confidence with a value of the previous frame comprehensive confidence; and if the reference comprehensive confidence is not smaller than the previous frame comprehensive confidence, retaining the value of the reference comprehensive confidence.

6. The method of claim 4, further comprising:

acquiring a current space confidence table and a current time confidence table of the current image frame according to the reference space confidence table, the reference time confidence table, the reference comprehensive confidence table and the previous frame comprehensive confidence table of the previous image frame.

7. The method of claim 6, wherein the acquiring of the current space confidence table and the current time confidence table of the current image frame according to the reference comprehensive confidence table and the previous frame comprehensive confidence table of the previous image frame comprises:

comparing comprehensive confidences of each of the plurality of virtual light source points in the reference comprehensive confidence table and the previous frame comprehensive confidence table;

if a reference comprehensive confidence in the reference comprehensive confidence table is smaller than a previous frame comprehensive confidence in the previous frame comprehensive confidence table, replacing a value of the reference space confidence with a value of a previous frame space confidence, and replacing a value of the reference time confidence with a value of a previous frame time confidence; and if the reference comprehensive confidence is not smaller than the previous frame comprehensive confidence, retaining the value of the reference space confidence and the value of the reference time confidence;

wherein previous frame space confidences of the plurality of virtual light source points are included in a previous frame space confidence table, and wherein previous frame time confidences of the plurality of virtual light source points are included in a previous frame time confidence table.

8. The method of claim 7, wherein:

values of the previous frame time confidences in the previous frame time confidence table are all smaller than values of reference time confidences in the reference time confidence table.

9. The method of claim 1, wherein the acquiring the current illumination parameter table of the current image frame according to the reference illumination parameter table, the current comprehensive confidence table, the previous frame comprehensive confidence table and the previous frame illumination parameter table of the previous image frame comprises:

comparing a current comprehensive confidence and a previous frame comprehensive confidence of each of the plurality of virtual light source points in the current comprehensive confidence table and in the previous frame comprehensive confidence table;

if the current comprehensive confidence of the virtual light source point is smaller than the previous frame comprehensive confidence, taking a previous frame illumination parameter of the virtual light source point as the currently determined illumination parameter of the virtual light source point; and if the current comprehensive confidence of the virtual light source point is not smaller than the previous frame comprehensive confidence, calculating the currently determined illumination parameter of the virtual light source point according to a defined rule.

10. The method of claim 9, wherein the calculating of the currently determined illumination parameter of the virtual light source point according to a defined rule comprises calculating the currently determined illumination parameter of the virtual light source point based on the current comprehensive confidence, a smoothing coefficient, the reference illumination parameter, the previous frame comprehensive confidence, and the previous frame illumination parameter.

11. The method of claim 7, wherein:
time confidences in a time confidence table of each image frame decreases with time, wherein the time confidence table of each image frame comprises the previous frame time confidence table and the current time confidence table; and
time confidences in the reference time confidence table of each image frame have a maximum value among time confidences of the previous frame time confidence table and the current time confidence table.

12. The method of claim 3, wherein:
the plurality of virtual light source points are uniformly distributed on the spherical surface.

13. A non-transitory computer-readable storage medium storing instructions thereon which, when executed by at least one processor, cause the at least one processor to execute a method for determining ambient illumination in an augmented reality (AR) scene, the method including:
acquiring a reference illumination parameter table of a current image frame captured for the AR scene, and establishing a reference comprehensive confidence table of the current image frame according to shooting information of the current image frame, wherein the reference illumination parameter table and the reference comprehensive confidence table respectively include reference illumination parameters and reference comprehensive confidences of a plurality of virtual light source points;
acquiring a current comprehensive confidence table of the current image frame according to the reference comprehensive confidence table and a previous frame comprehensive confidence table of a previous image frame; and
acquiring a current illumination parameter table of the current image frame according to the reference illumination parameter table, the current comprehensive confidence table, the previous frame comprehensive confidence table and a previous frame illumination parameter table of the previous image frame,
wherein the current illumination parameter table includes currently determined illumination parameters of the plurality of virtual light source points on a spherical surface whose center is at a position where the current image frame is captured.

14. An electronic device, comprising:
at least one processor; and
a memory in a communication connection with the at least one processor;
wherein the memory stores instructions causing the at least one processor to:
acquire a reference illumination parameter table of a current image frame captured for an augmented reality scene, and establish a reference comprehensive confidence table of the current image frame according to shooting information of the current image frame, wherein the reference illumination parameter table and the reference comprehensive confidence table respectively include reference illumination parameters and reference comprehensive confidences of a plurality of virtual light source points;
acquire a current comprehensive confidence table of the current image frame according to the reference comprehensive confidence table and a previous frame comprehensive confidence table of a previous image frame; and
acquire a current illumination parameter table of the current image frame according to the reference illumination parameter table, the current comprehensive confidence table, the previous frame comprehensive confidence table and a previous frame illumination parameter table of the previous image frame, wherein the current illumination parameter table includes currently determined illumination parameters of the plurality of virtual light source points on a spherical surface whose center is at a position where the current image frame is captured.

15. The electronic device of claim 14, wherein the instructions cause the at least one processor to:
establish a reference space confidence table of the current image frame according to a location and a pointing direction of a camera corresponding to the current image frame, and establish a reference time confidence table of the current image frame according to time when the current image frame is captured, wherein the reference space confidence table and the reference time confidence table respectively include reference space confidences and reference time confidences of the plurality of virtual light source points on the spherical surface whose center is at the position where the current image frame is captured; and
acquire the reference comprehensive confidence of each of the plurality of virtual light source points, and establishing the reference comprehensive confidence table.

16. The electronic device of claim 14, wherein the instructions cause the at least one processor to:
compare comprehensive confidences of each of the plurality of virtual light source points in the reference comprehensive confidence table and in the previous frame comprehensive confidence table;
if a reference comprehensive confidence in the reference comprehensive confidence table is smaller than a previous frame comprehensive confidence in the previous frame comprehensive confidence table, replace a value of the reference comprehensive confidence with a value of the previous frame comprehensive confidence; and
if the reference comprehensive confidence is not smaller than the previous frame comprehensive confidence, retain the value of the reference comprehensive confidence.

17. The electronic device of claim 15, wherein the instructions cause the at least one processor to:
acquire a current space confidence table and a current time confidence table of the current image frame according to the reference space confidence table, the reference time confidence table, the reference comprehensive confidence table and the previous frame comprehensive confidence table of the previous image frame.

18. The electronic device of claim 17, wherein the instructions cause the at least one processor to:
compare comprehensive confidences of each of plurality of virtual light source points in the reference comprehensive confidence table and the previous frame comprehensive confidence table;

if a reference comprehensive confidence in the reference comprehensive confidence table is smaller than a previous frame comprehensive confidence in the previous frame comprehensive confidence table, replace a value of the reference space confidence with a value of a previous frame space confidence, and replace a value of the reference time confidence with a value of a previous frame time confidence; and if the reference comprehensive confidence is not smaller than the previous frame comprehensive confidence, retain the value of the reference space confidence and the value of the reference time confidence, wherein previous frame space confidences of the plurality of virtual light source points are included in a previous frame space confidence table, and wherein previous frame time confidences of the plurality of virtual light source points are included in a previous frame time confidence table.

19. The electronic device of claim 14, wherein the instructions cause the at least one processor to:

compare a current comprehensive confidence and a previous frame comprehensive confidence of each of the plurality of virtual light source points in the current comprehensive confidence table and in the previous frame comprehensive confidence table;

if the current comprehensive confidence of the virtual light source point is smaller than the previous frame comprehensive confidence, take a previous frame illumination parameter of the virtual light source point as the currently determined illumination parameter of the virtual light source point; and if the current comprehensive confidence of the virtual light source point is not smaller than the previous frame comprehensive confidence, calculate the currently determined illumination parameter of the virtual light source point according to a defined rule.

20. The electronic device of claim 19, wherein the instructions cause the at least one processor to calculate the currently determined illumination parameter of the virtual light source point based on the current comprehensive confidence, a smoothing coefficient, the reference illumination parameter, the previous frame comprehensive confidence, and the previous frame illumination parameter.

* * * * *